R. E. HELLMUND.
VENTILATING APPARATUS.
APPLICATION FILED AUG. 7, 1917.

1,385,995.

Patented Aug. 2, 1921.

WITNESSES:
J. T. Wurmb
F. A. Lind.

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

VENTILATING APPARATUS.

1,385,995.  Specification of Letters Patent.  Patented Aug. 2, 1921.

Application filed August 7, 1917. Serial No. 184,798.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Ventilating Apparatus, of which the following is a specification.

My invention relates to ventilating apparatus having special relation to the ventilation of electrical machinery and it has for its object to provide a simple and inexpensive device of the character designated which shall prevent snow or ice from entering the machine casing.

Figure 1:
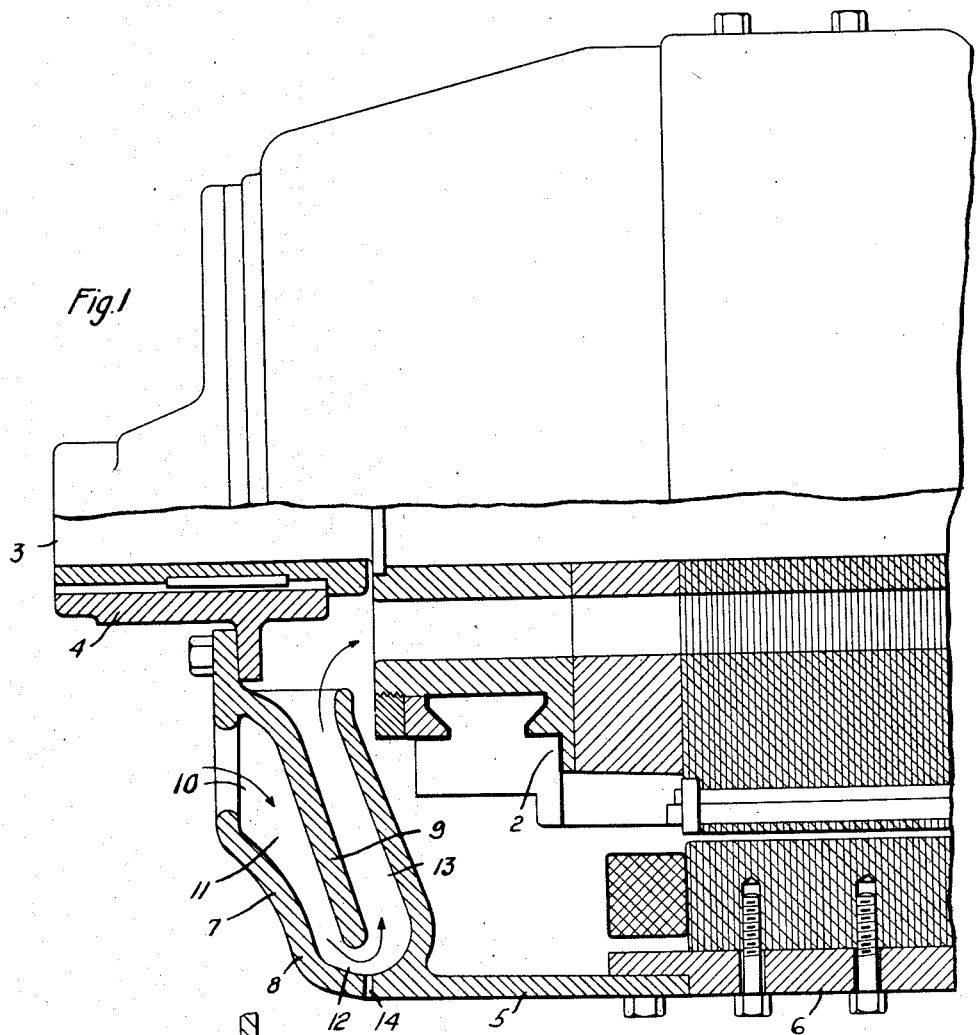
Figure 2:
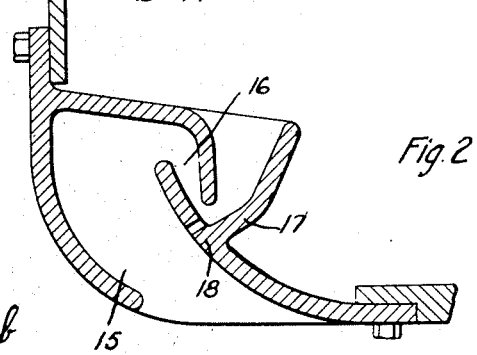

Referring to the accompanying drawings, Figure 1 is a fragmentary side view, partially in elevation and partially in section, of a motor embodying my invention. Fig. 2 is a sectional view of a portion of a motor casing embodying a slight modification of my invention.

Heretofore, difficulties have been encountered in ventilating machinery which is employed in outdoor service, in preventing snow or other congealed particles from entering with the air. By my invention, I provide a device whereby air is permitted to enter the machine casing, but, if the air contains snow or other congealed particles, the air opening will be automatically closed, and the ventilation of the machine will stop entirely until the machine heats, due to lack of ventilation, and melts the congealed particles, whereby the path for the circulation of air will be reopened.

In Fig. 1, a motor is shown having a rotor member 2 mounted on a shaft 3 which is provided with a bearing member 4. A casing member 5 is adapted to be attached to the bearing member 4 and to a main field frame 6 and is provided with a device 7 for admitting air into the motor casing. The device 7 consists of a substantially U-shaped member 8 and a downwardly extending member 9 which projects into said member 8. Air is admitted to a relatively large opening 10 in the member 8 and passes downwardly through a passageway 11 which is large at the top but tapers to a very narrow passage 12 between the end of the downwardly projecting member 9 and the concave end surface of the member 8. After passing through the narrow passage 12, the air issues to a much larger passageway 13 and from there passes inside the motor casing. The velocity of the air, in passing through the opening 10 and the top of the passageway 11, will be relatively low, but, on entering the passageway 12, the velocity will be relatively high because of the smaller dimensions of the last named passageway, after which the air passes into the relatively large passageway 13 at a much lower velocity. The air passing through the opening 10 and the top of the passageway 11, on account of its low velocity, would not tend to pick up any particles of foreign matter, but the velocity in the passageway 12 being relatively high, any particles of foreign matter in the air would be carried into the passageway 13. On account of the low velocity of the air in the passageway 13, the particles of foreign matter would not be carried upwardly with the air, and would therefore collect in a mass at the bottom of the concave surface of the U-shaped member 8, thereby preventing the flow of all ventilating air currents into the motor. When the temperature of the machine rises to such point as to melt the frozen particles which are collected in the passageway 12, the water resulting therefrom will pass out of the casing through a relatively narrow opening 14 which is located at the lowest point of the concave surface of the U-shaped member 8.

Referring to the modification of my invention shown in Fig. 2, the ventilating air currents are admitted through an upwardly extending air passage 15 from which it passes downwardly through an air passage 16 into a substantially U-shaped member 17. The U-shaped member 17 is adapted to collect the congealed particles until the ventilation ceases and the temperature rises, as described in connection with Fig. 1. The resulting water is then drained off through a narrow opening 18 which is similar to that shown at 14 in Fig. 1.

While I have herein described in detail several forms of my invention and one application of the same, I do not wish to be understood as limiting myself as regards the form of my invention or its application except as imposed by the prior art and as specifically set forth in the appended claims.

I claim as my invention:

1. An air intake device for a ventilated machine comprising a casing provided with a passageway for ventilating air currents having a constricted portion that is adapted to be closed by the accumulation of frozen particles therein.

2. An air intake device comprising a casing provided with a passageway for ventilating air currents having a constricted portion adapted to be automatically closed by the accumulation of particles of snow or ice and an outlet for the liquid resulting from the melting of said congealed particles.

3. An air intake device comprising a casing provided with a passageway of U-shape for ventilating air currents, the bottom portion of which is relatively narrow in order that solid particles borne by the entering air shall be caused to accumulate and close said bottom portion.

4. An air intake device comprising a casing provided with a passageway of substantially U-shape for ventilating air currents, the sides of which expand upwardly and the bottom of which is relatively narrow to arrest congealed particles borne by the inflowing air.

5. An air intake device consisting of a casing provided with an air passageway comprising a downwardly extending inlet portion of relatively small cross-section, a lowermost portion adapted to collect particles of foreign matter, and an upwardly extending outlet passage of relatively large cross-section.

In testimony whereof, I have hereunto subscribed my name this 30th day of July, 1917.

RUDOLF E. HELLMUND.